United States Patent [19]
Grave

[11] Patent Number: 6,144,359
[45] Date of Patent: Nov. 7, 2000

[54] LIQUID CRYSTAL DISPLAYS UTILIZING POLYMER DISPERSED LIQUID CRYSTAL DEVICES FOR ENHANCED PERFORMANCE AND REDUCED POWER

[75] Inventor: Duane A. Grave, Marion, Iowa

[73] Assignee: Rockwell Science Center, Thousand Oaks, Calif.

[21] Appl. No.: 09/050,781

[22] Filed: Mar. 30, 1998

[51] Int. Cl.$^7$ ..................................................... G09G 3/36
[52] U.S. Cl. ........................................... 345/102; 345/207
[58] Field of Search ............................... 345/102, 88, 87, 345/98, 100, 211, 207; 359/51, 53; 315/158; 340/784; 349/61, 64, 114, 25, 35

[56] References Cited

U.S. PATENT DOCUMENTS

| | | | |
|---|---|---|---|
| 4,386,345 | 5/1983 | Narveson et al. | 340/703 |
| 5,103,328 | 4/1992 | Numao | 359/53 |
| 5,146,355 | 9/1992 | Prince et al. | 359/50 |
| 5,406,305 | 4/1995 | Shimomura et al. | 345/102 |
| 5,428,265 | 6/1995 | Booth et al. | 315/158 |
| 5,440,324 | 8/1995 | Strickland et al. | 340/784 |
| 5,570,210 | 10/1996 | Yoshida et al. | 359/51 |
| 5,815,228 | 9/1998 | Flynn | 349/71 |

OTHER PUBLICATIONS

Duane A. Grave, Scot Olson and Philip Brown, Cockpit Displays II, Proceedings—SPIE—The International Society for Optical Engineering, *Enhanced AMLCD and Backlight for Extended Luminance Range and Sunlight Readability*, vol. 2462, Apr. 19–21, 1995.

*Primary Examiner*—Xiao Wu
*Attorney, Agent, or Firm*—Nathan O. Jensen; Kyle Eppele; J. P. O'Shaughnessy

[57] ABSTRACT

Disclosed is an avionics display device for use in the cockpit of an aircraft. The display device includes a liquid crystal display adapted for using a source of light to display information to a viewer and a backlight adapted to controllably provide a portion of the source of light for use by the liquid crystal display in displaying the information. A polymer dispersed liquid crystal (PDLC) device is positioned between the liquid crystal display and the backlight. An ambient light sensor adapted to sense a level of ambient light in the cockpit of the aircraft provides a sensor output indicative of the sensed ambient light level. Luminance control circuitry coupled to the ambient light sensor, to the backlight and to the PDLC device, receives the sensor output and generates as a function of the sensed ambient light level control signals for controlling the intensity of the light provided by the backlight and the transmissivity of the PDLC device.

18 Claims, 5 Drawing Sheets

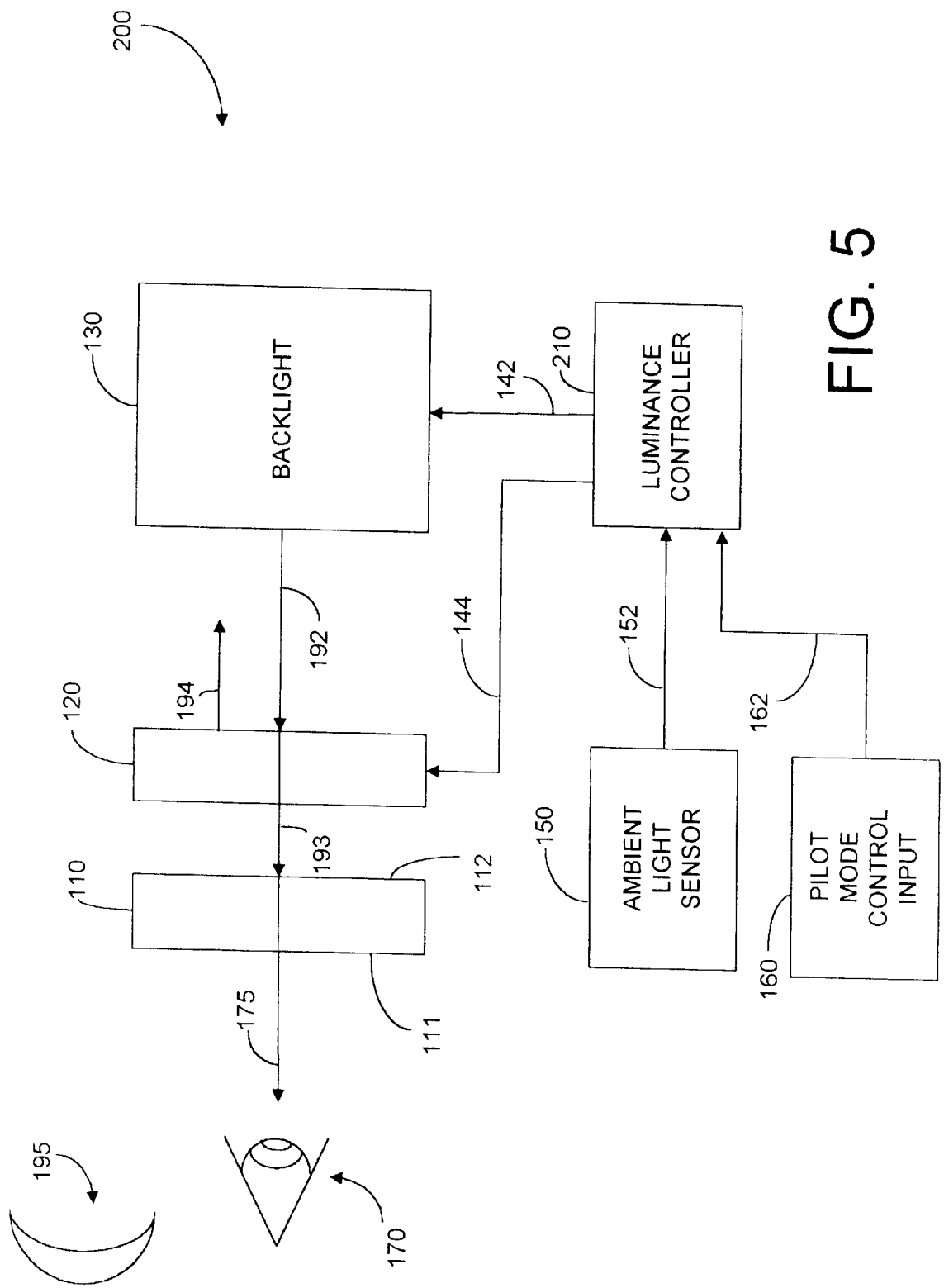

LIQUID CRYSTAL DISPLAYS UTILIZING POLYMER DISPERSED LIQUID CRYSTAL DEVICES FOR ENHANCED PERFORMANCE AND REDUCED POWER

FIELD OF THE INVENTION

The present invention relates to backlighting liquid crystal displays (LCDs) in day and night mode conditions. More particularly, the present invention relates to LCDs which utilize a polymer dispersed liquid crystal (PDLC) device to enhance day and night mode operation or to reduce backlight energy consumption and to extend battery life.

BACKGROUND OF THE INVENTION

Active matrix (AM) and other types of LCDs are increasingly being used as display devices in aircraft. To accommodate low level night operation and high ambient sunlight conditions, an extremely large backlight dimming range is necessary. A desired luminance range may be as large 0.03 FtL to 200 FtL (6667:1) over the display field of view. This is a much larger range than previously exhibited by typical hot cathode or cold cathode fluorescent lamps.

Previous backlight designs for backlighting LCDs have exhibited a limited luminance range of only Approximately 2000:1 for hot cathode lamps and 500:1 for cold cathode lamps. Conventional backlight designs cannot typically achieve the low end of the luminance range without the fluorescent lamp extinguishing or flickering. Since the difficulty in providing the extremely large dimming range occurs primarily at very low luminance levels, a backlight design capable of achieving a very low luminance uniform output without significantly affecting the maximum luminance level would be a significant improvement.

Additionally, transflective type LCDs have the disadvantage of high losses of luminance from the backlight device during night mode operations. Conventional transflective LCDs utilize a transflector which may reflect approximately 50 to 80 percent of ambient light impinging on the transflector's front surface. Thus, during the day with high levels of ambient light available, the reflected light can be used as a source of light to achieve sufficient daylight contrast, often without the use of the backlight. However, during night mode operation in which ambient light is generally unavailable for use in achieving desired contrast levels, a backlight must be used. Since conventional transflectors transmit only approximately 20 to 50 percent of the light generated by the backlight, they have proven to be inefficient during night mode operation. A transflective LCD, the transflector of which reflects a high percentage of ambient light for use in achieving high contrast during day mode operation, and which transmits a high percentage of backlight luminance to achieve high contrast during night mode operation, would also be a significant improvement.

SUMMARY OF THE INVENTION

Disclosed is a display device for use in the cockpit of an aircraft or in handheld portable devices. The display device includes a liquid crystal display adapted for using a source of light to display information to a viewer and a backlight adapted to controllably provide a portion of the source of light for use by the liquid crystal display in displaying the information. A polymer dispersed liquid crystal (PDLC) device is positioned between the liquid crystal display and the backlight. An ambient light sensor adapted to sense a level of ambient light in the cockpit of the aircraft provides a sensor output indicative of the sensed ambient light level. Luminance control circuitry coupled to the ambient light sensor, to the backlight and to the PDLC device, receives the sensor output and generates as a function of the sensed ambient light level control signals for controlling the intensity of the light provided by the backlight and the transmissivity of the PDLC device.

BRIEF DESCRIPTION OF THE DRAWINGS

FIG. 5 is a block diagram illustrating the AM-LCD device shown in FIG. 4, but functioning during night mode operations.

DETAILED DESCRIPTION OF THE PREFERRED EMBODIMENTS

Figure 1:
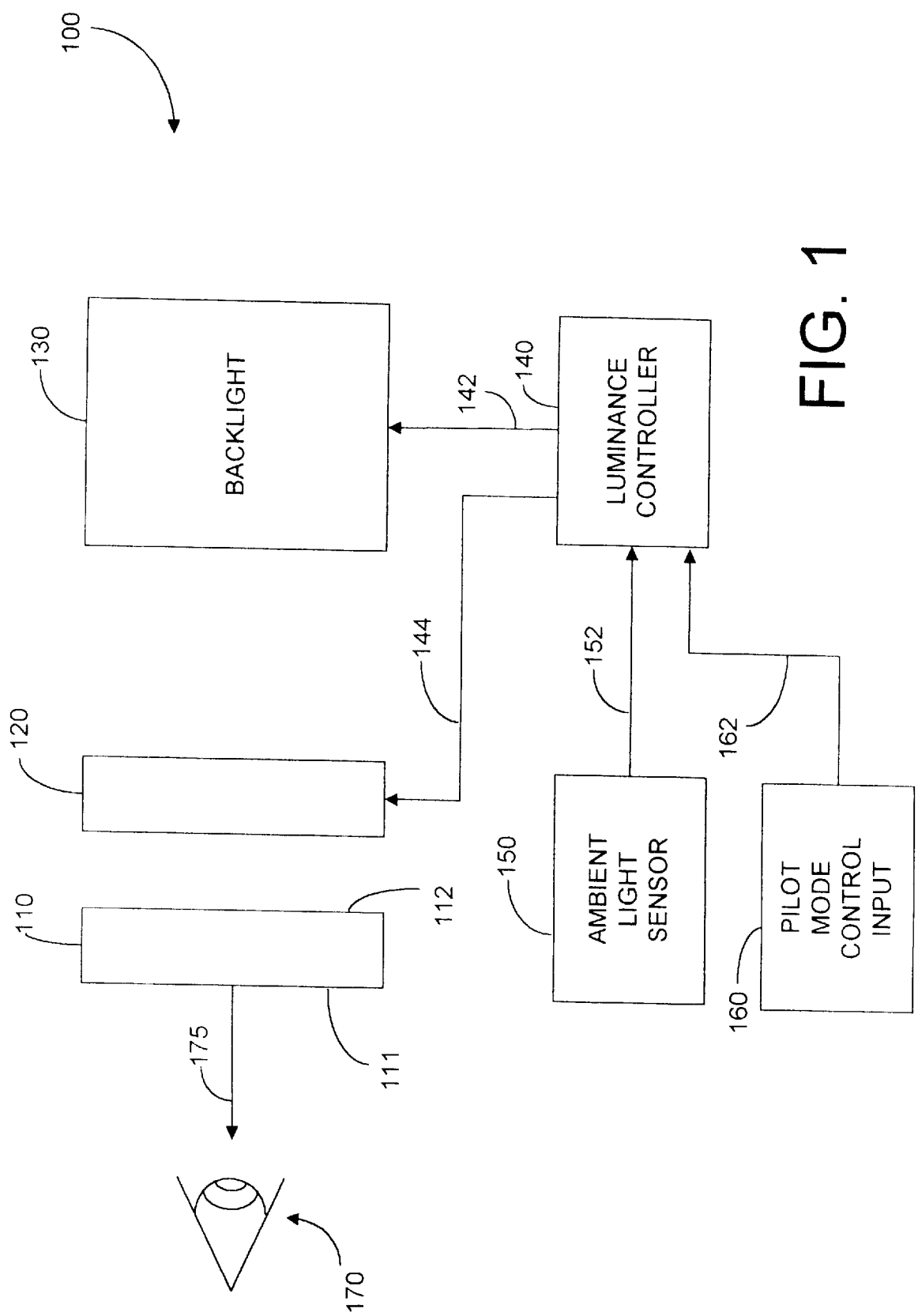
FIG. 1 is a block diagram illustrating a transflector-type display device in accordance with embodiments of the present invention.

FIG. 1 is a block diagram illustrating display device or system 100 in accordance with first embodiments of the present invention. Display device 100 is a transflective-type display device. Transflective-type display device 100 includes LCD 110, polymer dispersed liquid crystal (PDLC) device 120, backlight 130, luminance controller 140, ambient light sensor 150 and pilot mode control input device 160. Display device 100 is adapted to provide a high contrast display image using a combination of reflected ambient light and light generated from backlight 130. In addition to avionics applications, this invention would provide the advantages described herein in portable equipment, hand held equipment, vehicular equipment, and underwater dive equipment.

LCD 110 can be any of a variety of relatively low cost liquid crystal display devices having individual pixel positions, the transmissivity of which can be controlled to display different textual or graphical information to viewer 170. In order to provide light 175 directed toward viewer 170 and conveying the textual or graphical information, LCD 110 requires a source of light directed toward side 112. As is known in the art, LCD 110 conveys the textual or graphical information by controlling the transmissivity of its individual pixel positions PDLC device 120, also referred to as a shutter, is positioned between LCD 110 and backlight 130. PDLC device 120 typically includes a polymer sandwiched between glass plates. The phototopic transmission of the polymer of PDLC device 120 is changed as a function of the electric field generated between the conductive coatings on the glass. PDLC device 120 can be switched from a reflective (opaque) mode to a transmissive mode by applying a voltage and small current. Generally, PDLC devices such as device 120 require very little power, only on the order of microamps/cm$^2$. The control or drive voltages and currents used to control the transmissivity of PDLC device 120 are provided by control lines 144 from luminance controller 140.

Backlight 130 can be any of a wide variety of backlight designs. For example, backlight 130 can include dimmable fluorescent lamps along with reflectors and/or diffusers. In the alternative, backlight 130 can include light emitting diodes (LEDs), electroluminescent light sources, or incandescent lamps. Backlight 130 can be controlled to generate light in the general direction of LCD 110 for the purpose of displaying information to viewer 170. The luminance intensity provided by backlight 130 is controlled by luminance controller 140 via control signals provided on signal lines 142.

Ambient light sensor 150 senses the intensity level of ambient light in the cockpit of an aircraft in which display device 100 is installed and viewer 170 is positioned. The ambient light sensor 150 provides an indication to luminance controller 140 of the ambient light intensity levels via signals on signal line 152. Pilot mode control input device 160 can be a switch or other input device adapted to provide, via signal line 162, an indication to luminance controller 140 of whether display device 100 should function in a day mode or in a night mode. In accordance with preferred embodiments of the present invention, luminance controller 140 automatically controls PDLC device 120 and backlight 130 based upon signals from one or both of sensor 150 and input device 160. Illustration of the function of display device 100 in day and night modes of operation are illustrated in FIGS. 2 and 3, respectively.

Figure 2:
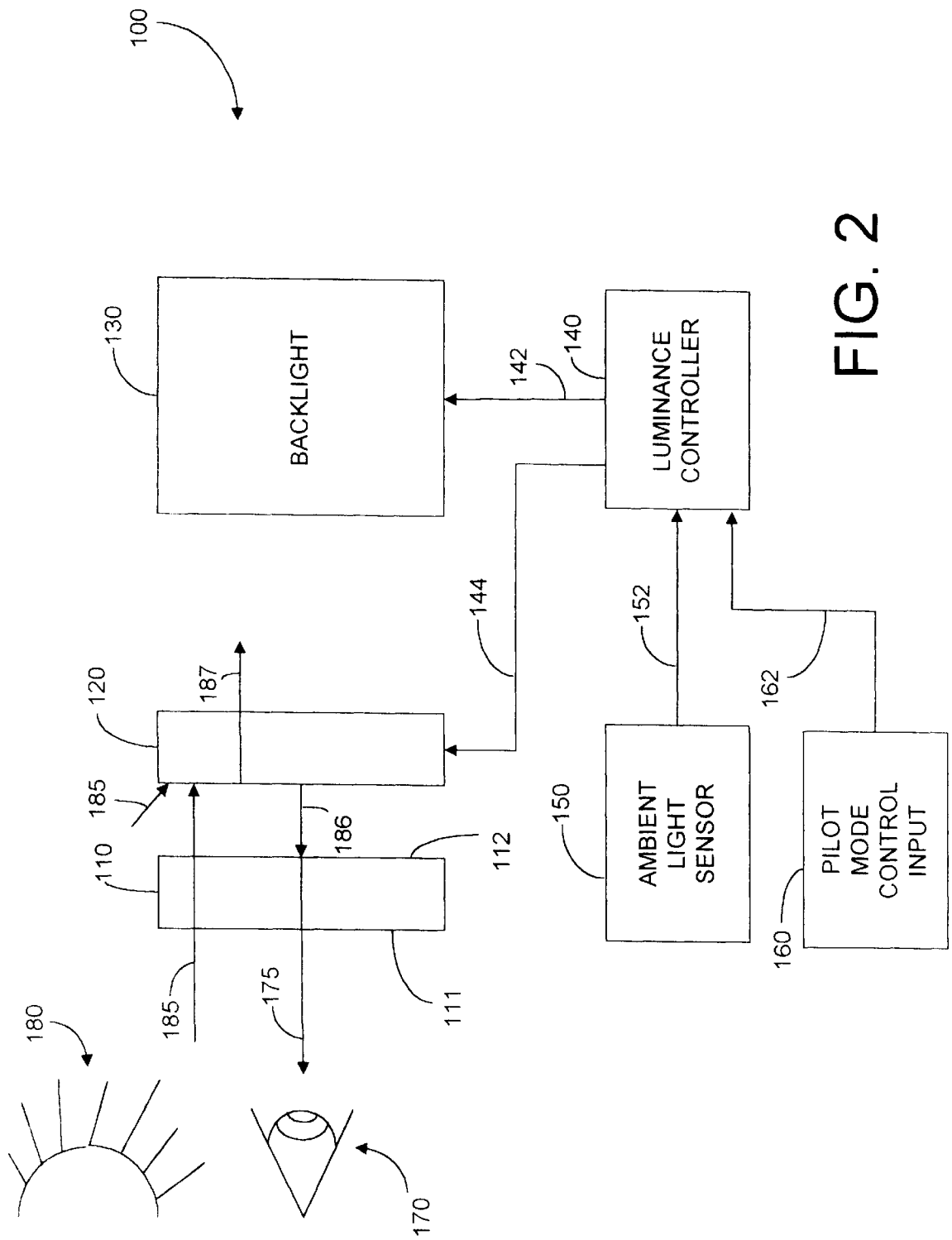
FIG. 2 is a block diagram illustrating the transflector-type display device shown in FIG. 1 during day mode operations.

As illustrated in FIG. 2, luminance controller 140 controls PDLC device 120 and backlight 130 such that LCD 110 relies primarily upon ambient light reflecting from PDLC device 120 and back through LDC 110 to achieve a desired level of contrast. To achieve this reflection, PDLC device 120 remains in an inactivated state (i.e., with little or no power applied). As discussed above, luminance controller 140 controls PDLC device 120 and backlight 130 based upon a determination of which mode of operation (day mode or night mode) is proper as determined using inputs from ambient light sensor 150 and/or from pilot mode control input device 160. Preferably, this determination occurs at least partially automatically based upon the ambient light level detected by sensor 150. Further, in preferred embodiments, the transmissivity of PDLC device 120 and the luminance output intensity of backlight 130 are controllable to achieve optimized contrast levels for ambient light levels which may be experienced and which fall between typical full day mode and typical full night mode ambient light levels.

In full day mode operations, luminance controller 140 controls backlight 130 to produce substantially no luminance output. Ambient light 185, for example from sun 180 or other sources of light, passes through LCD 110 and/or from the sides of display device 100. When controlled to be in its highly reflective state for day mode operations, PDLC device 120 reflects as light 186 approximately 80 percent or more of light 185. Consequently, 20 percent or less of ambient light 185 is transmitted as light 187 toward backlight 130. Reflected ambient light 186 passes through LCD 110 and ultimately serves as light 175 directed toward viewer 170 and used to display the textual or graphical information.

Figure 3:
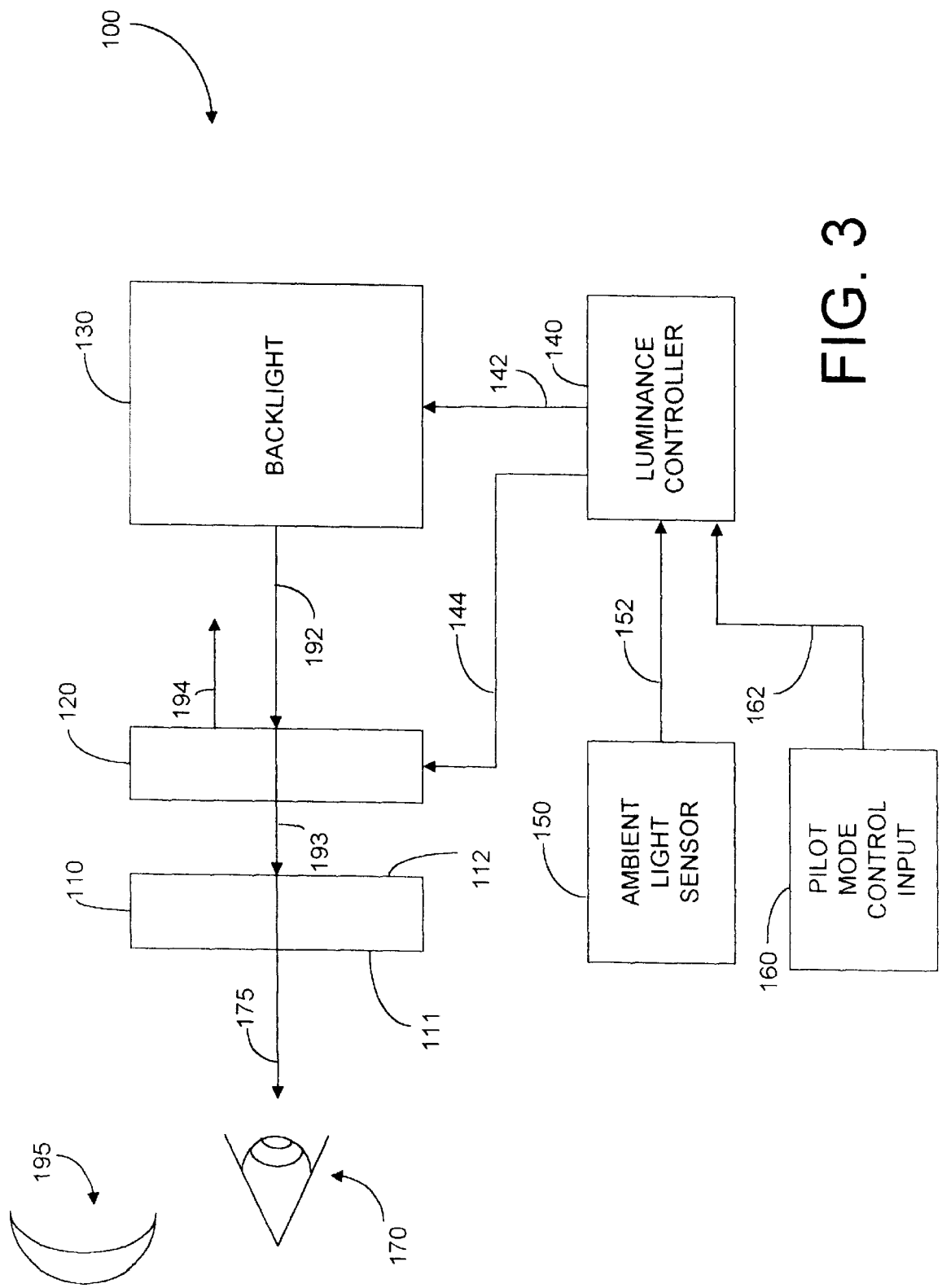
FIG. 3 is a block diagram illustrating the transflector-type display device shown in FIG. 1 during night mode operations.

As represented by the existence of moon 195, FIG. 3 illustrates the functions of display device 100 during night modes of operation. During night modes of operation, insufficient ambient light levels exist for display device 100 to function properly using primarily reflected ambient light. Consequently, light 192 output by backlight 130 is used to achieve the desired contrast and luminance levels. In this night mode of operation, as identified by ambient light sensor 150 and/or input device 160, luminance controller 140 generates control signals which cause PDLC device 120 to become photopically transmissive. Generally, the transmissivity of PDLC device 120 can be controlled such that light 193 passing through PDLC device 120 is at least about 85 percent of incident light 192 from backlight 130. Consequently, less than about 15 percent of light 192 is reflected by PDLC device 120 as light 194. Light 193 originating from backlight 130 and passing through PDLC device 120 ultimately passes through LCD 110 and serves as light 175 directed toward viewer 170 and adapted to convey the information.

As discussed above, FIGS. 2 and 3 illustrate operation of display device 100 at day and night mode extremes. However, in preferred embodiments, luminance controller 140 controls the transmissivity of PDLC device 120 over a spectrum or range of possible values based upon the ambient light level in the cockpit of the aircraft as determined by sensor 150. Simultaneously, luminance controller 140 controls backlight 130 in a similar manner to provide a range of easily achievable luminance levels. Thus, at times, display device 100 can operate using both reflected ambient light and light from backlight 130.

Transflective-type display device 100 provides a number of advantages over conventional transflective display devices. For example, the luminance levels necessary to achieve a desired contrast under a variety of ambient light conditions is significantly easier to achieve. Further, since approximately 85 percent of light from backlight 130 can be transmitted by transflector 120 during night mode operations, power consumption by backlight 130 in the night mode is significantly reduced. In portable and hand held devices the reduced power extends battery life. In comparison, transflector designs used by conventional transflective-type display devices typically transmitted as little as 20 percent of the backlight energy during night mode operations. Another advantage of transflective display device 100 is that the backlighting costs can be reduced by reducing the number of light sources such as LEDs and incandescent lamps. Further, weight and volume of backlight 130 can be reduced as a result. Also, the life of electroluminescent backlights can be significantly extended using the PDLC transflector concept.

Figure 4:
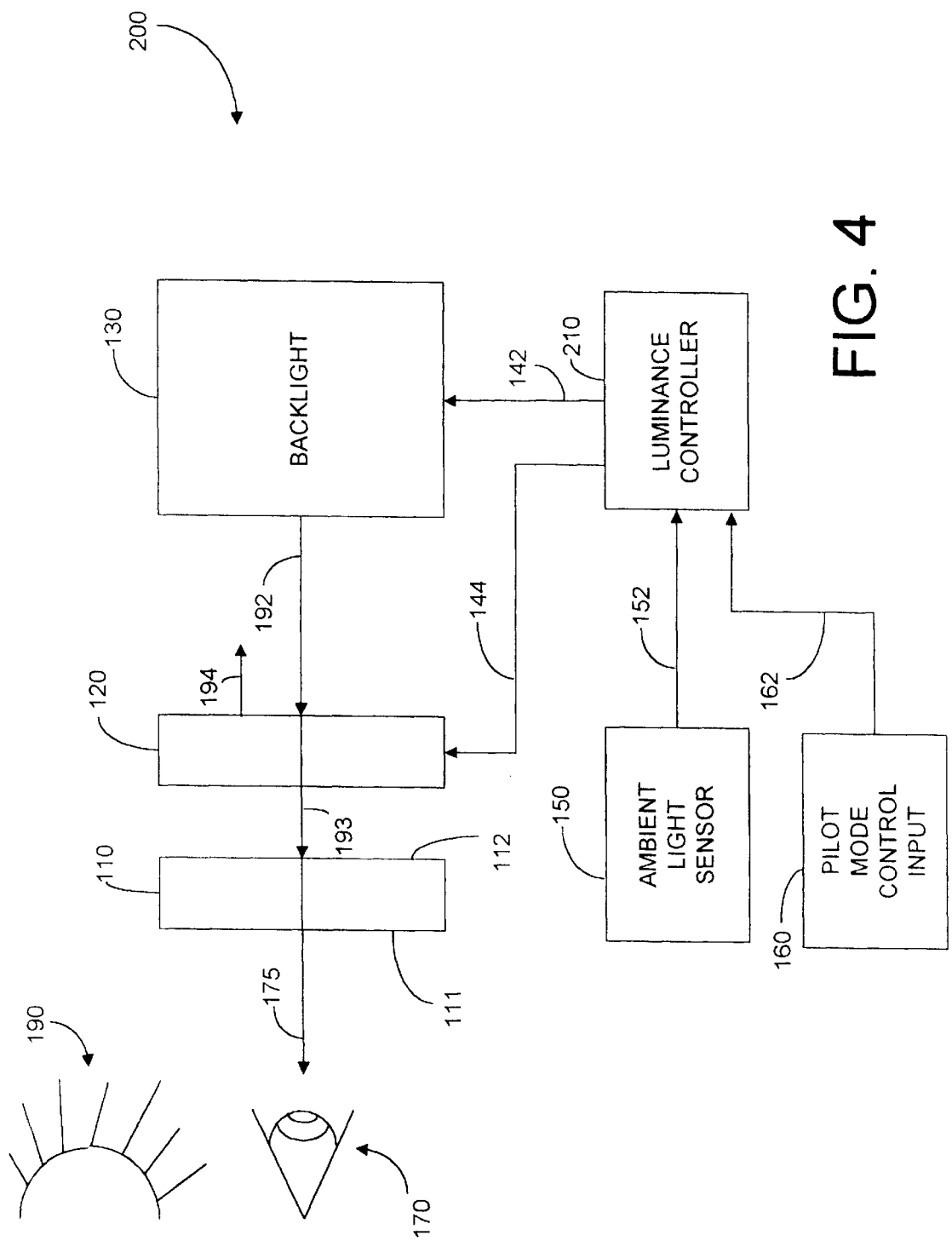
FIG. 4 is a block diagram illustrating an active matrix liquid crystal display (AM-LCD) device in accordance with alternate embodiments of the present invention, functioning during day mode operations.

FIGS. 4 and 5 are block diagrams illustrating display device 200 in accordance with alternate embodiments of the present invention. Display device 200 includes components which are similar to those included in display device 100, but display device 200 is not a transflective-type display. Instead, display device 200 relies substantially completely upon light from backlight 130 to display information. Display device 200 differs primarily from display device 100 illustrated in FIGS. 1–3 in that LCD 110 is preferably an AM-LCD or other type of liquid crystal device which is well suited for displaying information to viewer 170 in the cockpit of an aircraft, but which is not well suited to utilize reflected ambient light to display information.

During day mode operation as indicated by the presence of sun 190, ambient light sensor 150 provides an indication of the high levels of ambient light within the cockpit of the aircraft. Using this information alone, or in combination with an input from the pilot using mode control input device 160, luminance controller 210 controls PDLC device 120 and backlight 130 in order to achieve high display contrast during the day mode conditions. During day mode operations, high luminance levels from backlight 130 are required to achieve the desired display contrast.

Consequently, luminance controller 210 controls PDLC device 120 such that it transmits as light 193 a high percentage of light 192 from backlight 130. As discussed above with reference to the transflective-type display devices, in its most photopically transmissive state, PDLC device 120 transmits approximately 85 percent of incident light 192 from backlight 130. Consequently, light 194 reflected by PDLC device 120 would be as little as 15 percent of incident backlight energy 192. Light 193 transmitted through PDLC device 120 is controllably transmitted through AM-LCD 110 and becomes light 175 directed toward viewer 170 to display the textual or graphical information.

As indicated by the presence of moon 195, FIG. 5 illustrates the operation of display device 200 during night mode. During night mode, it is necessary to provide much lower luminance levels than during day mode operations. Since fluorescent lamp-type and other backlights experience difficulty when dimmed to achieve the lowest luminance levels in the required dimmable range, luminance controller 210 controls PDLC device 120 to reflect a higher percentage of backlight energy 192. When ambient light sensor 150 and/or pilot mode control input device 160 provide luminance controller 210 an indication that it should be functioning in night mode, luminance controller 210 controls PDLC device 120 to reduce its transmissivity, and increase its opaqueness. As discussed above, at a maximum PDLC device 120 will reflect as light 194 approximately 85 percent of incident backlight energy 192. With transmitted backlight energy 193 being as little as 15 percent of incident backlight energy 192, low luminance levels of light 175 directed toward viewer 170 can be achieved without dimming backlight 130 below its optimal range of operation. Therefore, as illustrated in FIGS. 4 and 5, PDLC device 120 can be controlled to achieve very low and uniform luminance levels during night mode operations, yet can be controlled during day mode operations to be highly transmissive so that little backlight energy is lost.

Although the present invention has been described with reference to preferred embodiments, workers skilled in the art will recognize that changes may be made in form and detail without departing from the spirit and scope of the invention.

What is claimed is:

1. An avionics display device for use in the cockpit of an aircraft, the display device comprising:

a liquid crystal display in a transflective mode adapted for using a source of light to display information to a viewer;

a backlight adapted to controllably provide at least a portion of the source of light for use by the liquid crystal display in displaying the information;

a polymer dispersed liquid crystal (PDLC) device positioned between the liquid crystal display and the backlight;

an ambient light sensor adapted to sense a level of ambient light in the cockpit of the aircraft and to provide a sensor output indicative of the sensed ambient light level; and luminance control circuitry coupled to the ambient light sensor, to the backlight and to the PDLC device, the luminance control circuitry receiving the sensor output and generating as a function of the sensed ambient light level control signals for controlling an intensity of the light provided by the backlight and for controlling the transmissivity of the PDLC device.

2. The avionics display device of claim 1, wherein when the sensed ambient light level is indicative of day mode operations, the luminance control circuit reduces the intensity of the light provided by the backlight and reduces the transmissivity of the PDLC device such that the source of light used by the liquid crystal display is provided primarily by ambient light reflected by the PDLC device back toward the liquid crystal display.

3. The avionics display device of claim 2, wherein during day mode operations the luminance control circuit turns off the backlight such that its power consumption and light output are minimized.

4. The avionics display device of claim 2, wherein when the sensed ambient light level is indicative of night mode operations, the luminance control circuit increases the intensity of the light provided by the backlight and increases the transmissivity of the PDLC device such that an increased percentage of the light provided by the backlight is transmitted through the PDLC device and such that the source of light used by the liquid crystal display is provided primarily from the backlight.

5. The avionics display device of claim 4, wherein for each of a plurality of different levels of sensed ambient light the control circuit is adapted to control the intensity of the light provided by the backlight to a different one of plurality of intensity levels and to control the transmissivity of the PDLC device to a different one of a plurality of transmissivity levels in order to provide the source of light used by the liquid crystal display using different ones of a plurality of combinations of light from the backlight and reflected ambient light.

6. The avionics display device of claim 1, wherein the liquid crystal display is an active matrix liquid crystal display.

7. The avionics display device of claim 6, wherein the backlight includes a fluorescent lamp.

8. The avionics display device of claim 7, wherein when the sensed ambient light level is indicative of day mode operations, the luminance control circuit automatically increases the intensity of the light provided by the backlight and increases the transmissivity of the PDLC device such that an increased percentage of the light provided by the backlight is transmitted through the PDLC device to thereby increase an intensity level of the source of light used by the active matrix liquid crystal display.

9. The avionics display device of claim 8, wherein when the sensed ambient light level is indicative of night mode operations, the luminance control circuit automatically decreases the intensity of the light provided by the backlight and decreases the transmissivity of the PDLC device such that a decreased percentage of the light provided by the backlight is transmitted through the PDLC device to thereby decrease an intensity level of the source of light used by the active matrix liquid crystal display.

10. The avionics display device of claim 9, wherein when the sensed ambient light level is indicative of night mode operations, the luminance control circuit automatically decreases the intensity of the light provided by the backlight and decreases the transmissivity of the PDLC device such that the decreased percentage of the light provided by the backlight is transmitted through the PDLC device to thereby decrease the intensity level of the source of light used by the active matrix liquid crystal display.

11. The avionics display device of claim 10, wherein for each of a plurality of different levels of sensed ambient light the control circuit is adapted to control the intensity of the light provided by the backlight to a different one of plurality of intensity levels or to control the transmissivity of the PDLC device to a different one of a plurality of transmissivity levels in order to provide the source of light used by the liquid crystal display at a corresponding different one of a plurality of intensity levels.

12. An avionics display device for use in the cockpit of an aircraft, the display device comprising:

transmissive mode liquid crystal display means for displaying information to a viewer;

backlight means for controllably providing a first source of light for use by the transmissive mode liquid crystal display means in displaying the information; and polymer dispersed liquid crystal (PDLC) device means positioned between the transmissive mode liquid crystal display means and the backlight means for controllably transmitting toward the transmissive mode liquid crystal display means a minority of the first source of light from the backlight means during night mode operations; and ambient light sensing means for sensing a level of ambient light in the cockpit of the aircraft and providing a sensor output indicative of the sensed ambient light level; and luminance control means coupled to the ambient light sensing means, to the backlight means and to the PDLC device means, for receiving the sensor output and automatically generating as a function of the sensed ambient light level control signals for controlling an intensity of the first source of light provided by the backlight means and for controlling a transmissivity of the PDLC device means.

13. The avionics display device of claim 12, wherein when the sensed ambient light level is indicative of day mode operations, the luminance control means controls the backlight means and the PDLC device means to increase the intensity of the first source of light provided by the backlight means and to increase the transmissivity of the PDLC device means such that the light used by the transmissive mode liquid crystal display means is provided primarily by the backlight means.

14. The avionics display device of claim 13, wherein when the sensed ambient light level is indicative of night mode operations, the luminance control means reduces the intensity of the first source of light provided by the backlight means and reduces the transmissivity of the PDLC device means such that light provided by the backlight means is transmitted through the PDLC device means at low level for night operation overcoming limitations of backlight low level operation.

15. The avionics display device of claim 14, wherein for each of a plurality of different levels of sensed ambient light the luminance control means controls the intensity of the first source of light provided by the backlight means to a different one of plurality of intensity levels and controls the transmissivity of the PDLC device means to a different one of a plurality of transmissivity levels in order to provide the light used by the transmissive mode liquid crystal display means.

16. A method of controlling an avionics display device having a liquid crystal display adapted for using a source of light to display information to a viewer, a backlight adapted to controllably provide at least a portion of the source of light for use by the liquid crystal display in displaying the information, and a polymer dispersed liquid crystal (PDLC) device positioned between the liquid crystal display and the backlight, the method comprising:

sensing a level of ambient light in the cockpit of an aircraft in which the avionics display device is installed; and automatically controlling the intensity of the light provided by the backlight and the transmissivity of the PDLC device as functions of the sensed ambient light level.

17. The method of claim 16, wherein the step of controlling further includes automatically controlling the intensity of the light provided by the backlight and the transmissivity of the PDLC device when the sensed ambient light level is indicative of day mode operations such that the intensity of the light provided by the backlight and the transmissivity of the PDLC device are reduced so that the source of light used by the liquid crystal display is provided primarily by ambient light reflected by the PDLC device back toward the liquid crystal display.

18. The method of claim 17, wherein the step of controlling further includes automatically controlling the intensity of the light provided by the backlight and the transmissivity of the PDLC device when the sensed ambient light level is indicative of night mode operations such that the intensity of the light provided by the backlight and the transmissivity of the PDLC device are increased so that the source of light used by the liquid crystal display is provided primarily by the backlight.

* * * * *